United States Patent
Liu et al.

(10) Patent No.: US 11,312,357 B2
(45) Date of Patent: Apr. 26, 2022

(54) ECMS-BASED PHEV FOUR-DRIVE TORQUE DISTRIBUTION METHOD

(71) Applicant: BEIJING INSTITUTE OF TECHNOLOGY, Beijing (CN)

(72) Inventors: Hui Liu, Beijing (CN); Yang Liu, Beijing (CN); Lijin Han, Beijing (CN); Huibin Xin, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 50 days.

(21) Appl. No.: 16/878,709

(22) Filed: May 20, 2020

(65) Prior Publication Data
US 2020/0369258 A1    Nov. 26, 2020

(30) Foreign Application Priority Data

May 20, 2019    (CN) .......................... 201910420452.8

(51) Int. Cl.
*B60W 20/11*    (2016.01)
*B60W 20/13*    (2016.01)
*B60W 50/00*    (2006.01)

(52) U.S. Cl.
CPC ............ *B60W 20/11* (2016.01); *B60W 20/13* (2016.01); *B60W 2050/0041* (2013.01);
(Continued)

(58) Field of Classification Search
CPC ......... B60W 20/13; B60W 2050/0041; B60W 2400/00; B60W 2510/244;
(Continued)

(56) References Cited

U.S. PATENT DOCUMENTS 5,847,566 A * 12/1998 Marritt ............... G01R 31/3648
324/427
6,646,419 B1 * 11/2003 Ying ..................... B60W 10/26
320/132
(Continued)

FOREIGN PATENT DOCUMENTS

CN    108773371 A   * 11/2018   ............... B60K 6/52

OTHER PUBLICATIONS

Optimal Energy Management Strategy of a Plug-in Hybrid Electric Vehicle Based on a Particle Swarm Optimization Algorithm (Year: 2015).*
(Continued)

*Primary Examiner* — Jeff A Burke
*Assistant Examiner* — Kyle T Johnson
(74) *Attorney, Agent, or Firm* — Brundidge & Stanger, P.C.

(57) ABSTRACT

An ECMS-based PHEV four-drive torque distribution method is disclosed. The method comprises: step 1, calculating an equivalent fuel consumption factor; step 2, calculating instantaneous total equivalent fuel consumption rate; step 3, converting all operating torque combinations of an engine, a BSG motor and a rear axle motor into the operating torque of a driving wheel, and determining the operating torque range of each power source; step 4, solving the minimum value of the instantaneous total equivalent fuel consumption rate within the actual operating torque range of each power source; and step 5, taking the operating torque of each power source corresponding to the minimum instantaneous total equivalent fuel consumption rate as the PHEV optimal operating torque for distribution.

5 Claims, 6 Drawing Sheets

(52) U.S. Cl.
CPC ... *B60W 2400/00* (2013.01); *B60W 2510/244* (2013.01); *B60W 2710/0666* (2013.01); *B60W 2710/083* (2013.01); *B60W 2720/40* (2013.01)

(58) Field of Classification Search
CPC ... B60W 2710/0666; B60W 2710/083; B60W 2720/40; B60W 2050/0039; B60W 10/06; B60W 10/08; B60W 2510/1005; B60W 20/10; B60K 6/547; B60K 6/52; B60K 6/442; B60K 6/48; Y02T 90/14; Y02T 10/40; Y02T 10/62
See application file for complete search history.

(56) References Cited

U.S. PATENT DOCUMENTS

| | | | | |
|---|---|---|---|---|
| 2001/0039230 | A1* | 11/2001 | Severinsky | B60K 1/02 477/3 |
| 2006/0006832 | A1* | 1/2006 | Kitajima | B60K 6/26 318/800 |
| 2009/0150016 | A1* | 6/2009 | Hung | B60W 10/08 701/22 |
| 2011/0017534 | A1* | 1/2011 | Kaltenbach | B60W 10/08 180/65.25 |
| 2012/0208672 | A1* | 8/2012 | Sujan | B60W 10/26 477/5 |
| 2017/0197611 | A1* | 7/2017 | Yamazaki | B60W 20/11 |
| 2018/0281620 | A1* | 10/2018 | Ourabah | B60L 15/2045 |
| 2019/0344776 | A1* | 11/2019 | Bidarvatan | B60W 20/13 |
| 2020/0198495 | A1* | 6/2020 | Rizzoni | B60L 50/51 |
| 2020/0307621 | A1* | 10/2020 | Ostrowski | G07C 5/0808 |
| 2020/0369258 | A1* | 11/2020 | Liu | B60K 6/547 |
| 2020/0398813 | A1* | 12/2020 | Hung | B60L 50/75 |
| 2021/0213933 | A1* | 7/2021 | Borrelli | B60W 20/13 |

OTHER PUBLICATIONS

Minimum Energy Management Strategy of Equivalent Fuel Consumption of Hybrid Electric Vehicle Based on Improved Global Optimization Equivalent Factor (Year: 2019).*
CN 108773371 Translation (Year: 2018).*
Adaptive equivalent consumption minimisation strategy and dynamic control allocation-based optimal power management strategy for four-wheel (Year: 2018).*
A-ECMS: An Adaptive Algorithm for Hybrid Electric Vehicle Energy Management (Year: 2015).*

* cited by examiner

ECMS-BASED PHEV FOUR-DRIVE TORQUE DISTRIBUTION METHOD

TECHNICAL FIELD

The present invention belongs to the technical field of new energy vehicles, and particularly relates to an ECMS-based PHEV four-drive torque distribution method.

BACKGROUND OF THE INVENTION

The ECMS algorithm has been widely used in academic research, but the actual vehicle controller still generally adopts rule-based energy management strategies. The calculation amount of the traditional ECMS algorithm is still too large for the vehicle controller and needs to be further simplified; in addition, the irregular shifting strategy obtained according to the ECMS algorithm will result in frequent shifting. The driving experience of a driver and the comfort of an occupant will be reduced. Traditional ECMS only considers the optimization of fuel consumption and fails to comprehensively consider vehicle drivability, which is difficult to directly apply to actual application control.

SUMMARY OF THE INVENTION

The purpose of the present invention is to provide an ECMS-based PHEV four-drive torque distribution method. The calculation process of the torque distribution is simplified, and the torques of all power sources are reasonably distributed, so that the number of vehicle shifts is reduced, the charge state of the power battery of the vehicle is kept balanced, the equivalent oil consumption is reduced, and the driving performance and riding comfort of the vehicle are improved.

The technical solution adopted by the present invention is an ECMS-based PHEV four-drive torque distribution method, wherein the method specifically comprises the following steps:

step 1, calculating an equivalent fuel consumption factor according to the residual electric quantity of a power battery; normalization processing the residual electric quantity of the power battery, and based on the normalization processing result, constructing an S-shaped function fitted by a third-order curve and a fourth-order curve to calculate the equivalent fuel consumption factor $s_e$ of the power battery using the following formulas:

$$X_{SOC} = \frac{SOC - (SOC_{obj} + SOC_{low})/2}{(SOC_{obj} - SOC_{low})/2} \quad (1)$$

$$s_e = 1 - a \cdot X_{SOC}^3 + b \cdot X_{SOC}^4 \quad (2)$$

In formula (1) and formula (2), $X_{SOC}$ is the normalized power battery residual electric quantity value, SOC is the residual electric quantity of the power battery, $SOC_{low}$ is the lower limit of the residual electric quantity of the power battery, and $SOC_{obj}$ is the target value of the residual electric quantity of the power battery, a and b are fitting parameters, respectively;

Step 2: calculating instantaneous total equivalent fuel consumption rate according to the equivalent fuel consumption factor $s_e$;

Step 3: converting all operating torque combinations of an engine, a BSG motor and a rear axle motor into the operating torque of a driving wheel, and determining the operating torque range of each power source according to the operating torque range of the driving wheel;

Step 4: solving the minimum value of the instantaneous total equivalent fuel consumption rate corresponding to all operating torque combinations of an engine, a BSG motor and a rear axle motor within the actual operating torque range of each power source; Step 5: taking the operating torque of each power source corresponding to the minimum instantaneous total equivalent fuel consumption rate as the PHEV optimal operating torque for distribution to the engine, the BSG motor, and the rear axle motor.

Further, in step 1, the parameters a and b are obtained by polynomial fitting, where a=1, b=0.6.

Further, in step 2, according to the equivalent fuel consumption factor $s_e$, the instantaneous total equivalent fuel consumption rate is calculated as shown in formula (3):

$$\dot{m}_{fuel\_total}(t) = \dot{m}_{eng}(t) + \frac{s_e \cdot P_{batt}(t)}{Q_{hv}} = \dot{m}_{eng}(t) + \frac{s_e \cdot \left(P_{bsg} \cdot \eta_{bsg}^{sgn(P_{bsg})} + P_m \cdot \eta_m^{sgn(P_m)}\right)}{Q_{hv}} \quad (3)$$

where $\dot{m}_{fuel\_total}(t)$ is the instantaneous total equivalent fuel consumption rate of the power system, $\dot{m}_{eng}(t)$ is the instantaneous fuel consumption rate of the engine system, $Q_{hv}$ is the low heating value of the fuel, $P_{batt}(t)$ is the charge and discharge power of the power battery, $P_{bsg}$ is the power of the BSG motor, $\eta_{bsg}^{sgn(P_{bsg})}$ is the operating efficiency of the BSG motor, $P_m$ is the power of the rear axle motor, and $\eta_m^{sgn(P_m)}$ is the operating efficiency of the rear axle motor.

Further, in step 3, the operating torque range of the engine is:

$$T_e \in \left[\max\left(\frac{T_r - T_{mmax} \cdot i_r \cdot i_1}{i_f \cdot i_0} - T_{bsgmax} \cdot i_b, T_{emin}\right),\right.$$
$$\left.\min\left(\frac{T_r}{i_f \cdot i_0} + T_{bsgmax} \cdot i_b, T_{emax}\right)\right]$$

the operating torque range of the rear axle motor is:

$$T_m \in \left[\max\left(\frac{T_{r\_motor} - T_{bsgmax} \cdot i_b \cdot i_f \cdot i_0}{i_r \cdot i_1}, 0\right),\right.$$
$$\left.\min\left(\frac{T_{r\_motor} + T_{bsgmax} \cdot i_b \cdot i_f \cdot i_0}{i_r \cdot i_1}, T_{mmax}\right)\right]$$

the operating torque range of the BSG motor is:

$$-T_{bsgmax} \leq \frac{T_r - T_m \cdot i_r \cdot i_1}{i_f \cdot i_0 \cdot i_b} - \frac{T_e}{i_b} \leq T_{bsgmax}$$

where $T_e$ is the operating torque of the engine, $T_r$ is the instantaneous operating torque of the driving wheels of the vehicle, $T_{mmax}$ is the maximum operating torque of the rear axle motor, $i_r$ is the transmission ratio of the two-speed transmission, $i_1$ is the speed ratio of the main reducer II, $i_f$ is transmission ratio of the DCT transmission, $i_0$ is the speed ratio of the main reducer I, $T_{bsgmax}$ is the maximum operating torque of the BSG motor, $i_b$ is the pulley transmission ratio, $T_{emin}$ is the minimum operating torque of the engine, $T_{emax}$ is the maximum operating torque of the engine, $T_m$ is the operating torque of the rear axle motor, $T_{r\ motor}$ is the driving wheel operating torque provided by the BSG motor and the rear axle motor.

Further, the solution of the minimum value of the minimum instantaneous total equivalent fuel consumption rate $\min(m_{fuel\_total}(t))$ in step 4 is as shown in formula (4):

$$\min(_{fuel\_total}(t)) = \min\left(\dot{m}_{eng}(t) + \frac{s_e \cdot \left(P_{bsg} \cdot \eta_{bsg}^{sgn(P_{bsg})} + P_m \cdot \eta_m^{sgn(P_m)}\right)}{Q_{hv}}\right) \quad (4)$$

The beneficial effects of the present invention are as follows: 1) the present invention can keep the charge state of the power battery balanced while the vehicle is running, and the equivalent oil consumption is reduced; 2) the present invention makes the fuel economy high while the vehicle is running, and improves the driving performance and riding comfort of the vehicle; 3) the present invention simplifies the calculation process of the torque distribution, reasonably distributes the torques of all power sources, and reduces the number of vehicle shifts.

BRIEF DESCRIPTION OF THE DRAWINGS

In order to more clearly explain the embodiments of the present invention or the technical solutions in the prior art, the drawings used in the description of the embodiments or the prior art will be briefly introduced below. Obviously, the drawings in the following description are merely some embodiments of the present invention. For those skilled in the art, other drawings can be obtained based on these drawings without paying creative labor.

DESCRIPTION OF THE PREFERRED EMBODIMENTS

In the following, the technical solutions in the embodiments of the present invention will be clearly and completely described with reference to the drawings in the embodiments of the present invention. Obviously, the described embodiments are merely some embodiments of the present invention, rather than all of the embodiments. Based on the embodiments of the present invention, all other embodiments obtained those skilled in the art without paying creative labor shall fall within the protection scope of the present invention.

Figure 1:
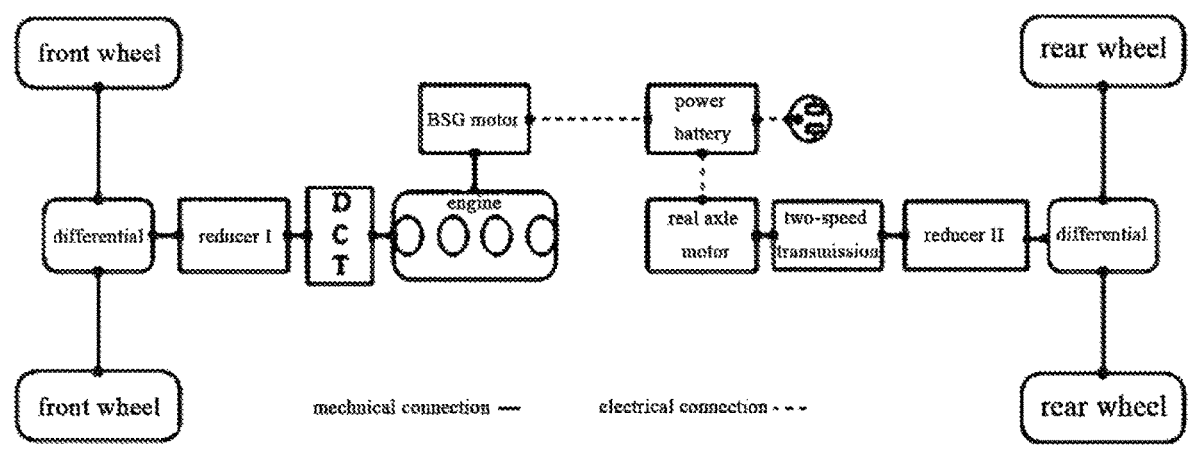
FIG. 1 is a configuration diagram of a power system of a parallel plug-in hybrid electric vehicle.

The configuration of a power system of a parallel plug-in hybrid electric vehicle is shown in FIG. 1. The front drive shaft is driven by the engine and BSG motor, and the rear drive shaft is driven by the rear axle motor. The engine is connected to the DCT transmission and the main reducer I. The rear axle motor is connected to a two-speed transmission and a main reducer II. The BSG motor is electrically connected to the power battery and the rear axle motor in order. The main reducer I and the main reducer II are connected to the wheels through a differential.

Figure 2:
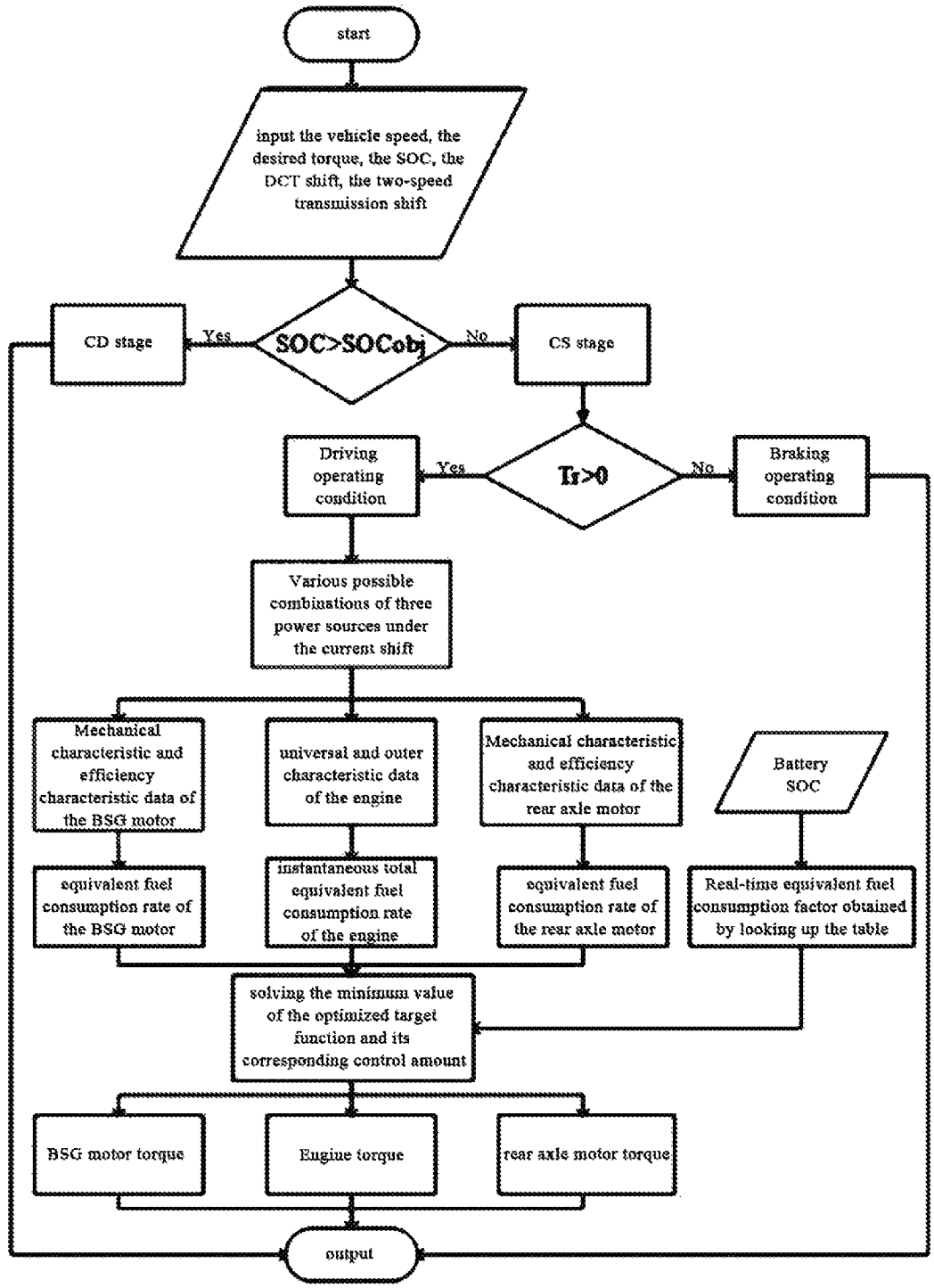
FIG. 2 is a logic flow chart of the present invention.

The flow of the ECMS-based PHEV four-drive torque distribution method is shown in FIG. 2, wherein the method specifically comprises the following steps:

step 1, calculating an equivalent fuel consumption factor $s_e$ according to the residual electric quantity of a power battery.

The equivalent fuel consumption factor affects the power distribution ratio of the engine and the power battery, and also affects keeping the residual electric quantity of the power battery balanced. If the equivalent fuel consumption factor is too high, the cost of electrical energy will be amplified and the power output of the rear axle motor cannot be fully utilized; if the equivalent fuel consumption factor is too low, the cost of electrical energy will be reduced, and the power battery will discharge more, so that the residual electric quantity of the power battery is unbalanced; when the residual electric quantity of the power battery is low, the power system should adjust the equivalent fuel consumption factor to increase, which in turn increases the use of fuel. When the residual electric quantity of the power battery is high, the power system should increase the use of electrical energy, that is, reduce the equivalent fuel consumption factor; the residual electric quantity of the power battery is subjected to normalization processing, in which the normalization process is shown in formula (1.1). An S-shaped function fitted by a third-order curve and a fourth-order curve is constructed based on the normalization processing result of the residual electric quantity of the power battery to calculate the equivalent fuel consumption factor $s_e$ of the power battery. The mapping relationship between the residual electric quantity of the power battery and the equivalent fuel consumption factor $s_e$ is established, as shown in as formula (1.2):

$$X_{SOC} = \frac{SOC - (SOC_{obj} + SOC_{low})/2}{(SOC_{obj} - SOC_{low})/2} \quad (1.1)$$

$$s_e = 1 - a \cdot X_{SOC}^3 + b \cdot X_{SOC}^4 \quad (1.2)$$

Figure 3:
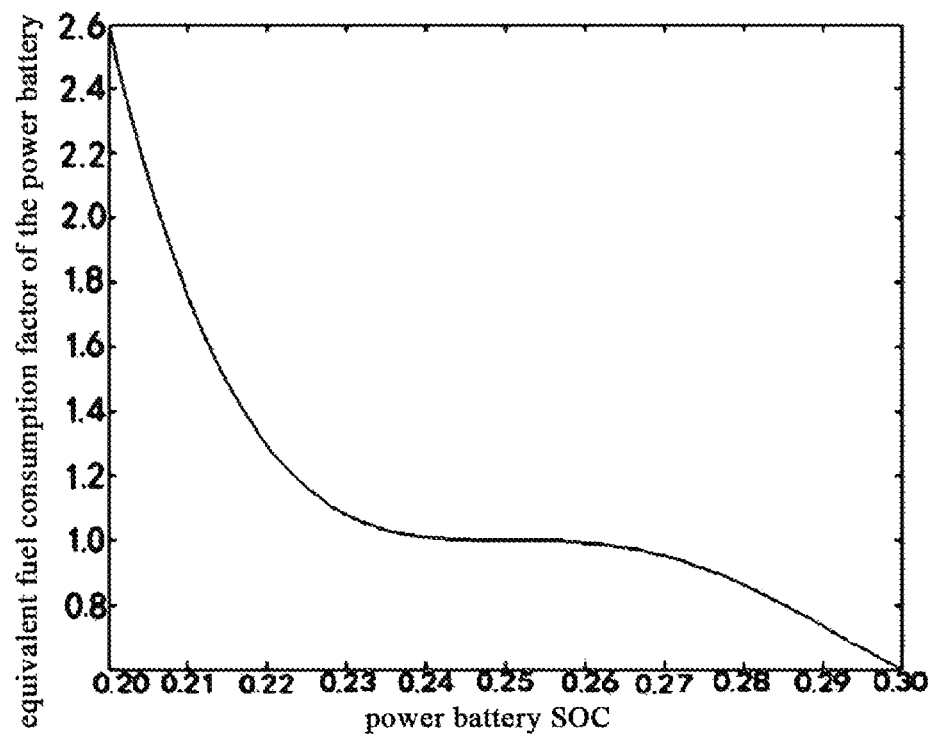
FIG. 3 is the relationship curve between the SOC of the power battery and the equivalent fuel consumption factor.

In formula (1.1) and formula (1.2), $X_{SOC}$ is the normalized power battery residual electric quantity value, SOC is the residual electric quantity of the power battery, $SOC_{low}$ is the lower limit of the residual electric quantity of the power battery, $SOC_{obj}$ is the target value of the residual electric quantity SOC of the power battery, a and b are fitting parameters, respectively; the relationship between the fuel consumption factor $s_e$ of the power battery and the power battery SOC is shown in FIG. 3, where the parameters a and b are obtained by polynomial fitting, where a=1, b=0.6; when the residual electric quantity of the power battery is 0.25, the equivalent fuel consumption factor $s_e$ is taken as 1, and there is no need to modify the equivalent fuel consumption of the residual electric quantity of the power battery. When $SOC \in [0.20, 0.24]$, it is necessary to increase the equivalent fuel consumption factor $s_e$, reduce the use of electric energy of the power battery, charge the power battery, and keep the power battery SOC balanced. When the power battery $SOC \in [0.24, 0.30]$, the equivalent fuel consumption factor gradually decreases, and the use of the electric energy of the power battery is increased.

Step 2: the instantaneous total equivalent fuel consumption rate is calculated according to the equivalent fuel consumption factor $s_e$, and the charge and discharge power $P_{batt}(t)$ of the power battery is calculated by the power and the operating efficiency of the rear axle motor and the BSG motor, as shown in formula (1.3):

$$P_{batt}(t) = P_{bsg} \cdot \eta_{bsg}^{sgn(P_{bsg})} P_m \cdot \eta_m^{sgn(P_m)} \quad (1.3)$$

In formula (1.3), sgn ($P_{bsg}$) is a sign function, $$sgn(P_{bsg}) = \begin{cases} -1, & P_{bsg} > 0 \\ 1, & P_{bsg} < 0 \end{cases},$$

sgn ($P_m$) is a sign function, $$sgn(P_m) = \begin{cases} -1, & P_m > 0 \\ 1, & P_m < 0 \end{cases},$$

$P_{bsg}$ is the power of the BSG motor, $\eta_{bsg}^{sgn(P_{bsg})}$ is the operating efficiency of the BSG motor, $P_m$ is the power of the rear axle motor, and $\eta_m^{sgn(P_m)}$ is the operating efficiency of the rear axle motor.

The instantaneous total equivalent fuel consumption rate is calculated according to the equivalent fuel consumption factor $s_e$, as shown in formula (1.4):

$$\dot{m}_{fuel\_total}(t) = \dot{m}_{eng}(t) + \frac{s_e \cdot P_{batt}(t)}{Q_{hv}} = \dot{m}_{eng}(t) + \frac{s_e \cdot \left(P_{bsg} \cdot \eta_{bsg}^{sgn(P_{bsg})} + P_m \cdot \eta_m^{sgn(P_m)}\right)}{Q_{hv}} \quad (1.4)$$

In formula (1.4), $\dot{m}_{fuel\_total}(t)$ is the instantaneous total equivalent fuel consumption rate of the power system, $\dot{m}_{eng}(t)$ is the instantaneous fuel consumption rate of the engine system, $Q_{hv}$ is the low heating value of the fuel.

Step 3: all operating torque combinations of an engine, a BSG motor and a rear axle motor are converted into the operating torque of a driving wheel, and the operating torque range of each power source is determined.

The operating torque constraints of each power source of a PHEV car are as follows:

$$\begin{cases} 0 \leq T_m \leq T_{mmax} \\ -T_{bsgmax} \leq T_{bsg} \leq T_{bsgmax} \\ T_{emin} \leq T_e \leq T_{emax} \end{cases}$$

In the above formula, $T_m$ is the operating torque of the rear axle motor, $T_{mmax}$ is the maximum operating torque of the rear axle motor, $T_{bsgmax}$ is the maximum operating torque of the BSG motor, $T_{bsg}$ is the operating torque of the BSG motor, and $T_{emin}$ is the minimum operating torque of the engine, $T_e$ is the operating torque of the engine, and $T_{emax}$ is the maximum operating torque of the engine.

The calculation formula for the instantaneous operating torque $T_r$ of the driving wheels of the vehicle is as follows:

$$T_r = (T_e + T_{bsg} \cdot i_b) \cdot i_f \cdot i_0 + T_m \cdot i_r \cdot i_1 \quad (1.5)$$

In formula (1.5), $i_b$ is the pulley transmission ratio, $i_f$ is transmission ratio of the DCT transmission, $i_0$ is the speed ratio of the main reducer I, $i_r$ is transmission ratio of the two-speed transmission, and $i_1$ is the speed ratio of the main reducer II.

According to the constraints and formula (1.5), it can be known that the operating torque range of the engine is:

$$T_e \in \left[\max\left(\frac{T_r - T_{mmax} \cdot i_r \cdot i_1}{i_f \cdot i_0} - T_{bsgmax} \cdot i_b, T_{emin}\right),\right.$$
$$\left.\min\left(\frac{T_r}{i_f \cdot i_0} + T_{bsgmax} \cdot i_b, T_{emax}\right)\right]$$

The instantaneous driving wheel operating torque of the vehicle is provided by the three power sources, that is, the engine, the BSG motor and the rear axle motor. For the determined engine torque, the driving wheel operating torque $T_{r\_motor}$ provided by the BSG motor and the rear axle motor is:

$$T_{r\_motor} = T_r - T_e \cdot i_f \cdot i_0 \quad (1.6)$$

Further:

$$T_{r\_motor} = T_{bsg} \cdot i_b \cdot i_f \cdot i_0 + T_m \cdot i_r \cdot i_1 \quad (1.7)$$

According to the operating torque constraints of each power source, formula (1.6) and formula (1.7), it can be known that the operating torque range of the rear axle motor is:

$$T_m \in \left[\max\left(\frac{T_{r\_motor} - T_{bsgmax} \cdot i_b \cdot i_f \cdot i_0}{i_r \cdot i_1}, 0\right),\right.$$
$$\left.\min\left(\frac{T_{r\_motor} + T_{bsgmax} \cdot i_b \cdot i_f \cdot i_0}{i_r \cdot i_1}, T_{mmax}\right)\right]$$

According to formula (1.6) and formula (1.7), the operating torque requirement of the BSG motor is:

$$T_{bsg} = \frac{T_r - T_m \cdot i_r \cdot i_1}{i_f \cdot i_0 \cdot i_b} - \frac{T_e}{i_b}$$

The operating torque range of the BSG motor is:

$$-T_{bsgmax} \leq \frac{T_r - T_m \cdot i_r \cdot i_1}{i_f \cdot i_0 \cdot i_b} - \frac{T_e}{i_b} \leq T_{bsgmax}$$

Step 4: the minimum value of the instantaneous total equivalent fuel consumption rate corresponding to all operating torque combinations of an engine, a BSG motor and a rear axle motor is solved within the actual operating torque range of each power source.

The minimum value of $m_{fuel\_total}(t)$ is solved by formula (1.8)

$$\min(_{fuel\_total}(t)) = \min\left(\dot{m}_{eng}(t) + \frac{S_e \cdot \left(P_{bsg} \cdot \eta_{bsg}^{sgn(P_{bsg})} + P_m \cdot \eta_m^{sgn(P_m)}\right)}{Q_{hv}}\right) \quad (1.8)$$

Step 5: the operating torque of each power source corresponding to the minimum instantaneous total equivalent fuel consumption rate is taken as the PHEV optimal operating torque for distribution to the engine, the BSG motor, and the rear axle motor.

When the parallel plug-in hybrid electric vehicle is in the stage of maintaining the residual electric quantity, the power battery needs to be charged by the engine driving the BSG motor to generate electricity and braking energy recovery. The electric energy of the power battery is still essentially derived from the fuel. According to the invention, the equivalent relationship between the consumed electric energy and fuel required to compensate for the consumed electric energy is established, the power sources of the hybrid electric vehicle are attributed to the same energy consumption index, and torque distribution is performed, so that the calculation process is simple, the torque distribution is reasonable, and the torque distribution can be intuitively linked to fuel consumption, which actually reduces vehicle fuel consumption.

Embodiments

Simulink® is used to build the ECMS control strategy model, comprising a signal input module, an ECMS control module, and an output module. The ECMS control module comprises an operating torque calculation module, a driving and braking judging module, a charge-depleting (CD) module, an ECMS algorithm module, and a braking energy recovery module.

The ECMS optimal torque distribution calculation module calculates the torque range that the engine, BSG motor, and the rear axle motor need to output or input according to the current vehicle operating point and other parameters, that is, the feasible range of each power source at this time; for all the power distribution schemes in the feasible range, the instantaneous total equivalent fuel consumption is calculated according to the equivalent fuel consumption factor and the efficiency characteristic data of the engine and the motor. The power output combination of the power source with the minimum equivalent fuel consumption is selected as the optimal control amount, and the operating torque of each power source is distributed to track various operating parameters during vehicle model driving.

Figure 4:
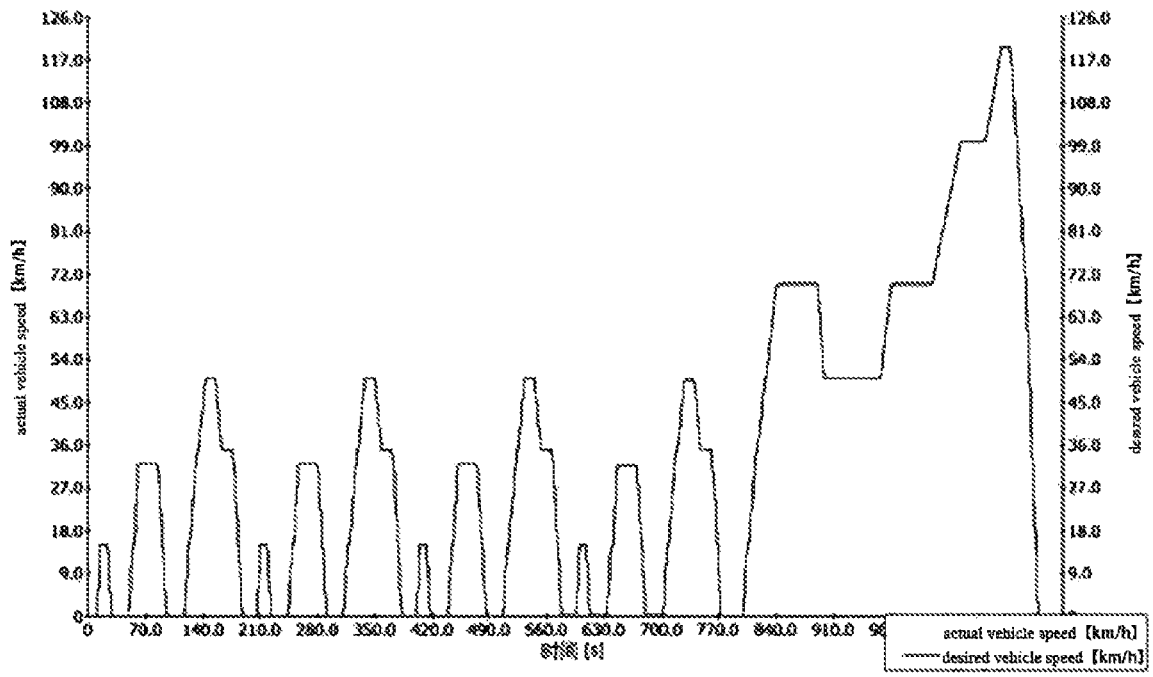
FIG. 4 is a vehicle speed following diagram of the embodiment.
Figure 5:
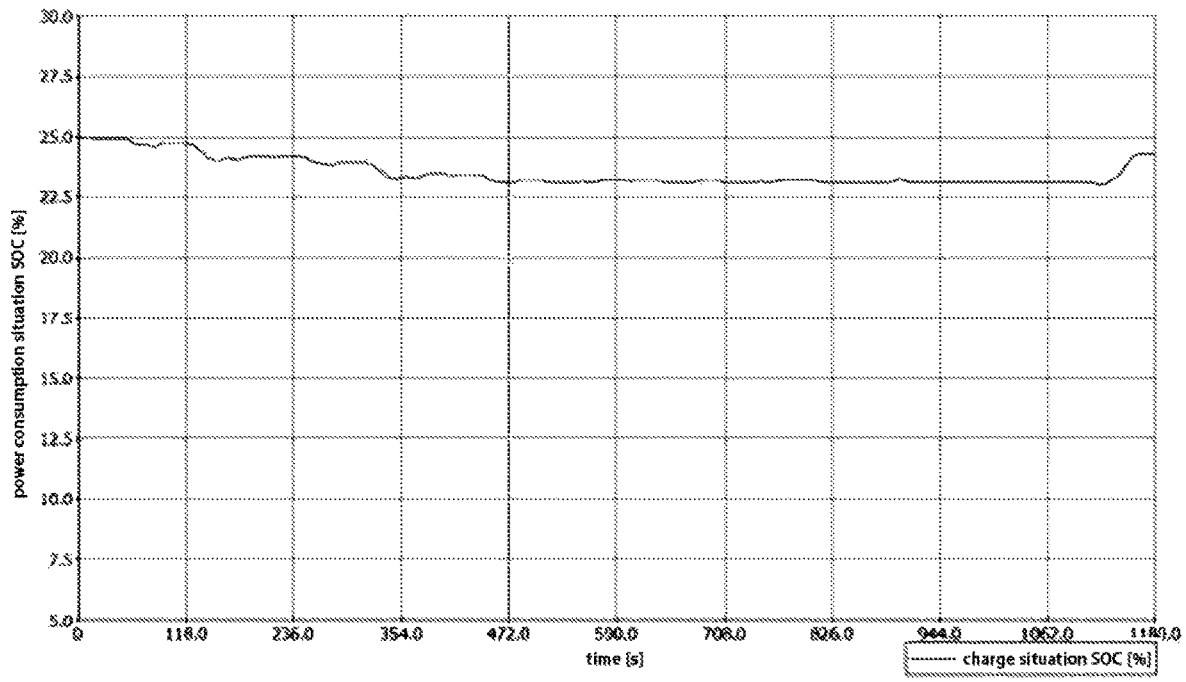
FIG. 5 is a changing curve of the charge state of the power battery of the embodiment.

1. The following situation of the vehicle is shown in FIG. 4. The torque distribution of the present invention enables the output of each power source of the vehicle to meet the needs of the vehicle driving wheels at the expected speed, so that the actual speed of the vehicle is always consistent with the expected speed;

2. The SOC balance of the power battery is shown in FIG. 5. At the beginning of the simulation process, the initial SOC of the power battery is 25%, the SOC of the power battery at the end of the simulation process is 24.29%, and the SOC change of the power battery in the simulation process always floats in the range of 3%, and the SOC of the power battery can be basically kept balanced. At the initial stage, the residual electric quantity of the power battery is high, the equivalent fuel consumption factor is small, and the operating torque of the whole vehicle is not large, so that the use of electric energy not only can meet the torque operation of the whole vehicle, but also is more economical. As the SOC of the power battery decreases, the equivalent fuel consumption factor increases. At this time, the engine, the BSG motor and the rear axle motor are driven in coordination to keep the SOC of the power battery balanced. The operating torque of the whole vehicle at the tail end is large, the equivalent fuel consumption factor increases, the engine operates near the optimal torque curve and the fuel consumption rate is low. At this time, the engine is driven separately; at the deceleration stage at the end of the operating condition, the rear axle motor recovers and braking energy, and SOC change of the power battery is always within 3%.

3. Working condition of the engine

Figure 6:
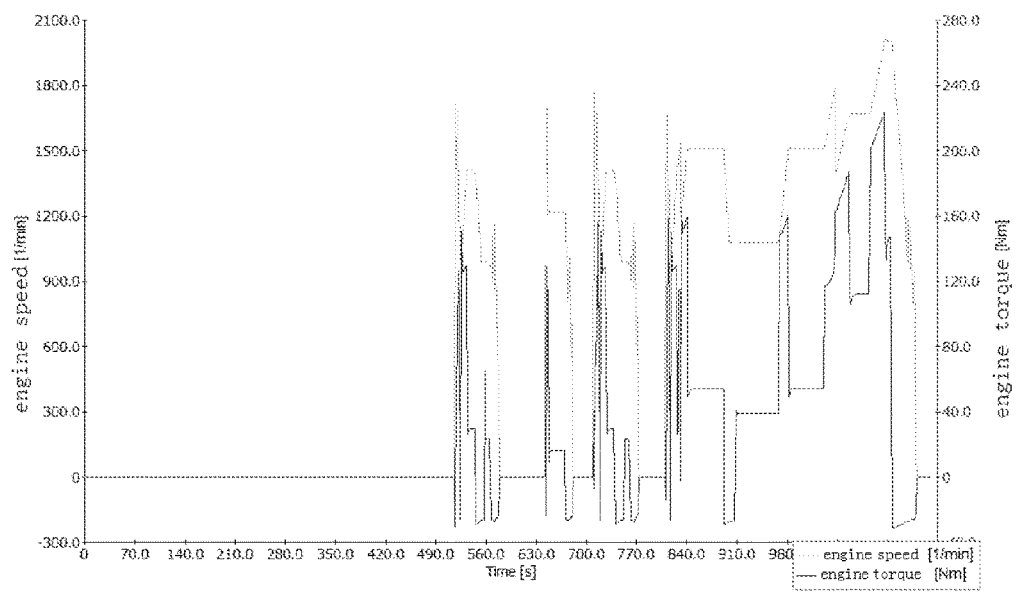
FIG. 6 is a operating state diagram of the engine of the embodiment.

In the simulation process, the operating condition of the engine is shown in FIG. 6 below. Based on the torque distribution method of the present invention, the engine is generally maintained in a relatively stable and efficient operating area, and the fuel economy is better.

4. Shifting condition of the DCT transmission and the two-speed transmission

Figure 7:
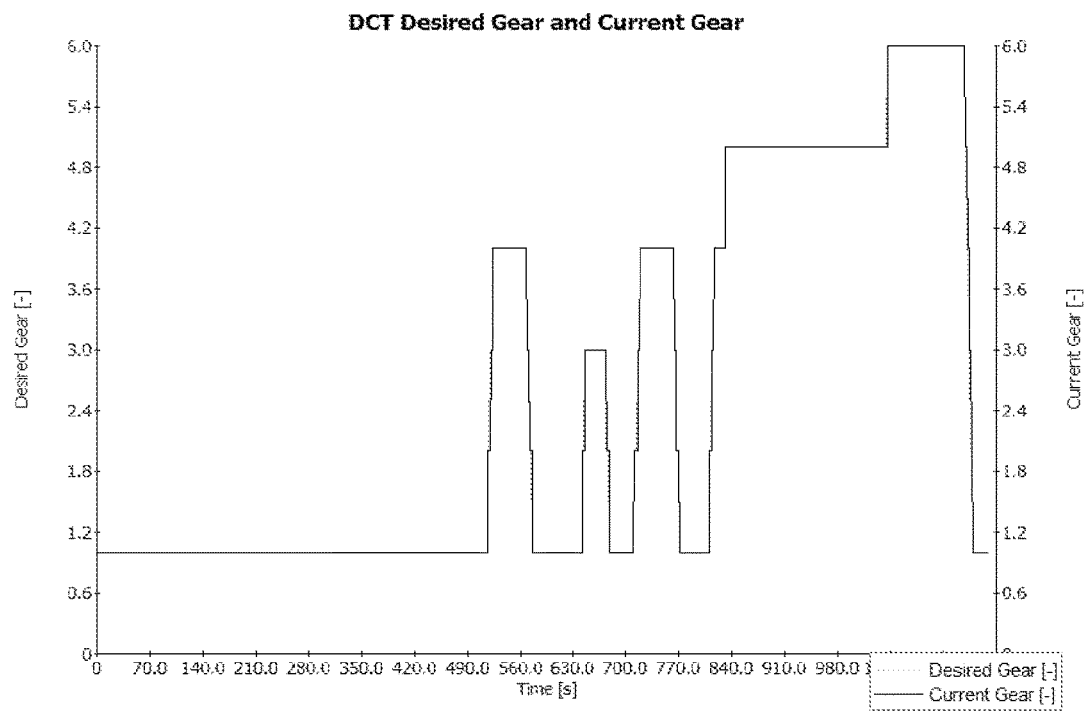
FIG. 7 is a diagram of a shift situation of a six-speed dual-clutch transmission of the embodiment.
Figure 8:
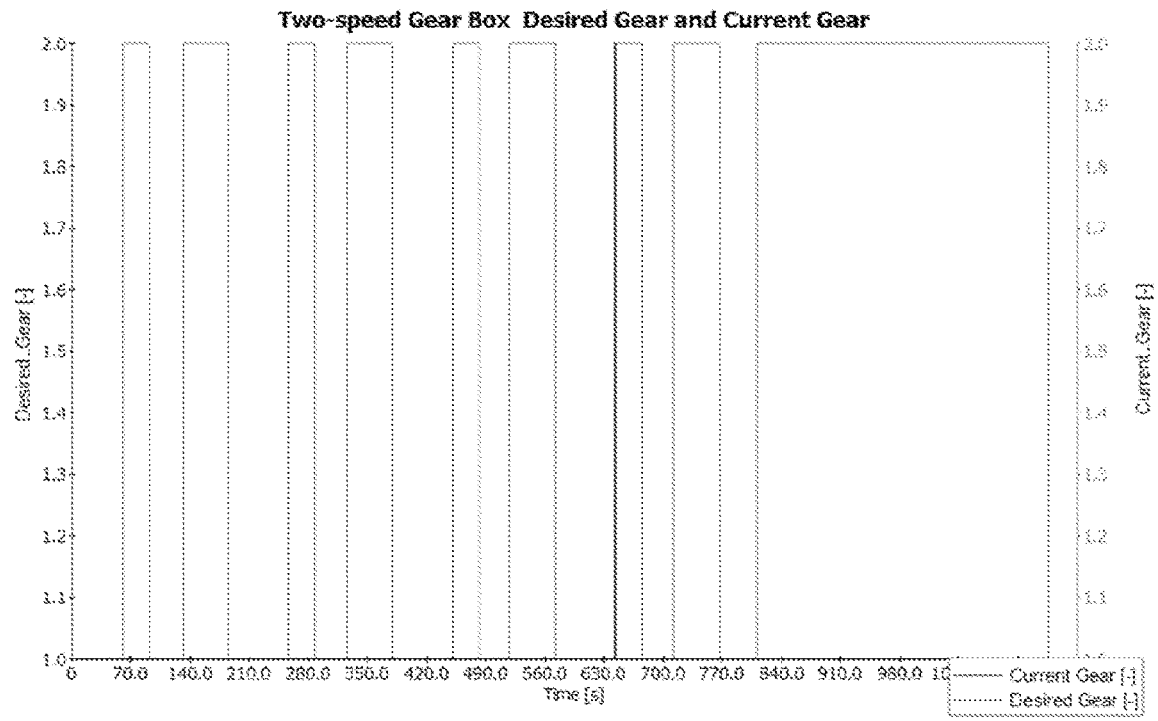
FIG. 8 is a diagram of a shift situation of a two-speed transmission of the embodiment.

The shifting condition of the DCT transmission and the two-speed transmission is shown in FIGS. 7 and 8. The DCT transmission and the two-speed transmission are shifted smoothly, and the driving performance and riding comfort of the vehicle are good.

Figure 9:
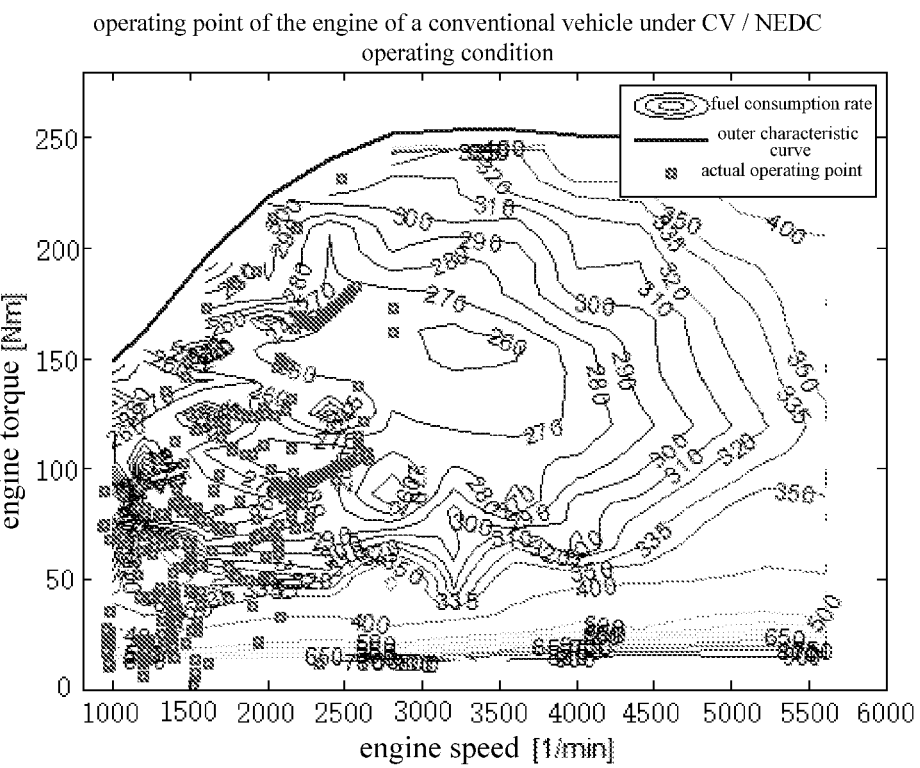
FIG. 9 is an operating point diagram of an engine of a conventional vehicle under NEDC operating conditions.
Figure 10:
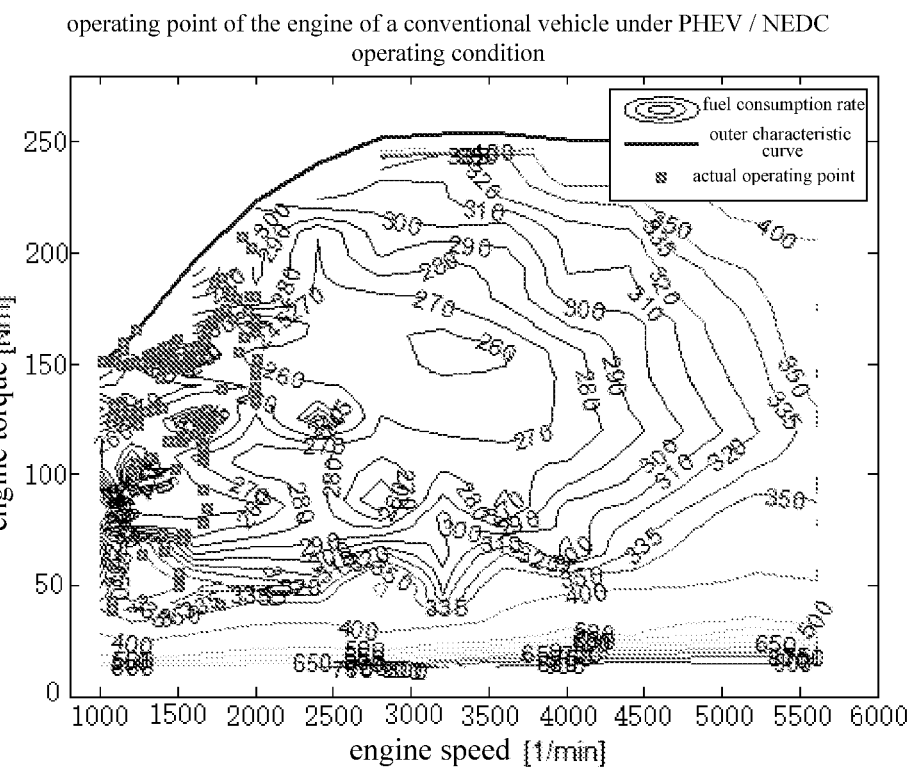
FIG. 10 is an operating point diagram of an engine of the embodiment.

The comparison between the simulation results of this embodiment and the fuel consumption of conventional oil vehicles is shown in Table 1. When the vehicle using the torque distribution of the present invention travels for 100 kilometers, the fuel consumption is 5.05, while the fuel consumption of conventional vehicles is 7.98. The use of the distribution method of the present invention can obviously reduce the fuel consumption of the vehicle and improve the fuel economy of the vehicle; the operating point of the engine of the conventional vehicle is shown in FIG. 9, and the operating point of the vehicle engine of the present invention is shown in FIG. 10. It can be known from FIG. 9 and FIG. 10 that the number of the operating points of the engine of this embodiment is smaller than that of a conventional vehicle, and the operating points are distributed in a more concentrated manner. More operating points are distributed in a low fuel consumption area. The present invention makes the fuel consumption in the vehicle driving process the lowest, and the fuel economy of the vehicle is good.

TABLE 1

| Simulation result and comparison of the control strategy of the present invention | | |
|---|---|---|
| Simulation task (under NEDC working conditions) | Fuel consumption (L/100 km) | Fuel saving rate |
| Fuel consumption of conventional oil vehicles | 7.98 | — |
| Electric balance fuel consumption of the ECMS-based optimization strategy | 5.05 | 36.72% |

Each embodiment in this specification is described in a related manner, and the same or similar parts between the various embodiments can be referred to each other. Each embodiment focuses on the differences from other embodiments. In particular, for the system embodiment, since it is basically similar to the method embodiment, the description is relatively simple. For the relevant part, refer to the description of the method embodiment.

The above descriptions are merely preferred embodiments of the present invention, and are not intended to limit the protection scope of the present invention. Any modification, equivalent replacement, and improvement made within the spirit and principle of the present invention are included in the protection scope of the present invention.

What is claimed is:

1. An equivalent consumption minimization strategy (ECMS)-based PHEV four-drive torque distribution method, wherein the method comprises the following steps:
   step 0, obtaining a residual electric quantity of the power battery, a lower limit of the residual electric quantity of the power battery, and a target value of the residual electric quantity of the power battery;
   step 1, calculating an equivalent fuel consumption factor according to the residual electric quantity of the power battery, the lower limit of the residual electric quantity of the power battery, and the target value of the residual electric quantity of the power battery;
   normalization processing the residual electric quantity of the power battery, and based on the normalization processing result, constructing an S-shaped function fitted by a third-order curve and a fourth-order curve to calculate the equivalent fuel consumption factor $s_e$ of the power battery using the following formulas:

$$X_{SOC} = \frac{SOC - (SOC_{obj} + SOC_{low})/2}{(SOC_{obj} - SOC_{low})/2} \quad (1)$$

$$s_e = 1 - a \cdot X_{SOC}^3 + b \cdot X_{SOC}^4 \quad (2)$$

wherein in the formula (1) and formula (2), $X_{SOC}$ is the normalized residual electric quantity value of the power battery, SOC is the residual electric quantity of the power battery, $SOC_{low}$ is the lower limit of the residual electric quantity of the power battery, and $SOC_{obj}$ is the target value of the residual electric quantity of the power battery, a and b are fitting parameters, respectively;
   step 2: calculating instantaneous total equivalent fuel consumption rate according to the equivalent fuel consumption factor $s_e$;
   step 3: converting all operating torque combinations of an engine, a BSG motor and a rear axle motor into an operating torque of a driving wheel, and determining the operating torque range of each power source according to the operating torque range of the driving wheel;
   step 4: solving the minimum value of the instantaneous total equivalent fuel consumption rate corresponding to all operating torque combinations of the engine, the BSG motor and the rear axle motor within the actual operating torque range of each power source; and
   step 5: controlling the PHEV according to the operating torque of each power source corresponding to the minimum instantaneous total equivalent fuel consumption rate such that the engine, the BSG motor, and the rear axle motor of the PHEV operate at their respective operating torque corresponding to the minimum instantaneous total equivalent fuel consumption rate.

2. The ECMS-based PHEV four-drive torque distribution method according to claim 1, wherein in the step 1, the parameters a and b are obtained by polynomial fitting, where a=1, b=0.6.

3. The ECMS-based PHEV four-drive torque distribution method according to claim 1, wherein in the step 2, according to the equivalent fuel consumption factor se, the instantaneous total equivalent fuel consumption rate is calculated as shown in formula (3):

$$\dot{m}_{fuel\_total}(t) = \dot{m}_{eng}(t) + \frac{s_e \cdot P_{batt}(t)}{Q_{hv}} = \dot{m}_{eng}(t) + \frac{s_e \cdot \left(P_{bsg} \cdot \eta_{bsg}^{sgn(P_{bsg})} + P_m \cdot \eta_m^{sgn(P_m)}\right)}{Q_{hv}} \quad (3)$$

Wherein the $\dot{m}_{fuel\_total}(t)$ is the instantaneous total equivalent fuel consumption rate of the power system, the $\dot{m}_{eng}(t)$ is the instantaneous fuel consumption rate of the engine system, the $Q_{hv}$ is the low heating value of the fuel, the $P_{batt}(t)$ is the charge and discharge power of the power battery, the $P_{bsg}$ is the power of the BSG motor, the $\eta_{bsg}^{sgn(P_{bsg})}$ is the operating efficiency of the BSG motor, the $P_m$ is the power of the rear axle motor, and the $\eta_m^{sgn(P_m)}$ is the operating efficiency of the rear axle motor.

4. The ECMS-based PHEV four-drive torque distribution method according to claim 1, wherein in the step 3, the operating torque range of the engine is:

$$T_e \in \left[ \max\left( \frac{T_r - T_{mmax} \cdot i_r \cdot i_1}{i_f \cdot i_0} - T_{bsgmax} \cdot i_b, T_{emin} \right), \right.$$

$$\left. \min\left( \frac{T_r}{i_f \cdot i_0} + T_{bsgmax} \cdot i_b, T_{emax} \right) \right]$$

the operating torque range of the rear axle motor is:

$$T_m \in \left[ \max\left( \frac{T_{r\_motor} - T_{bsgmax} \cdot i_b \cdot i_f \cdot i_0}{i_r \cdot i_1}, 0 \right), \right.$$

$$\left. \min\left( \frac{T_{r\_motor} + T_{bsgmax} \cdot i_b \cdot i_f \cdot i_0}{i_r \cdot i_1}, T_{mmax} \right) \right]$$

the operating torque range of the BSG motor is:

$$-T_{bsgmax} \leq \frac{T_r - T_m \cdot i_r \cdot i_1}{i_f \cdot i_0 \cdot i_b} - \frac{T_e}{i_b} \leq T_{bsgmax}$$

wherein the $T_e$ is the operating torque of the engine, the $T_r$ is the instantaneous operating torque of the driving wheels of the vehicle, the $T_{mmax}$ is the maximum operating torque of the rear axle motor, the $i_r$ is the transmission ratio of a two-speed transmission, the $i_1$ is the speed ratio of a main reducer II, the $i_f$ is transmission ratio of a DCT transmission, the $i_0$ is the speed ratio of a main reducer I, the $T_{bsgmax}$ is the maximum operating torque of the BSG motor, the $i_b$ is the pulley transmission ratio, the $T_{emin}$ is the minimum operating torque of the engine, the $T_{emax}$ is the maximum operating torque of the engine, the $T_m$ is the operating torque of the rear axle motor, and the $T_{r\_motor}$ is the driving wheel operating torque provided by the BSG motor and the rear axle motor.

5. The ECMS-based PHEV four-drive torque distribution method according to claim 1, wherein the solution of the minimum value of the minimum instantaneous total equivalent fuel consumption rate $\min(m_{fuel\_total}(t))$ in step 4 is as shown in formula (4):

$$\min(\dot{m}_{fuel\_total}(t)) = \min\left(\dot{m}_{eng}(t) + \frac{s_e \cdot \left(P_{bsg} \cdot \eta_{bsg}^{sgn(P_{bsg})} + P_m \cdot \eta_m^{sgn(P_m)}\right)}{Q_{hv}}\right). \quad (4)$$

* * * * *